(12) United States Patent
Wu

(10) Patent No.: US 10,902,658 B2
(45) Date of Patent: Jan. 26, 2021

(54) METHOD FOR IMAGE SPLICING

(71) Applicant: BEIJING KINGSOFT INTERNET SECURITY SOFTWARE CO., LTD., Beijing (CN)

(72) Inventor: Xiaojun Wu, Beijing (CN)

(73) Assignee: BEIJING KINGSOFT INTERNET SECURITY SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/285,887

(22) Filed: Feb. 26, 2019

(65) Prior Publication Data

US 2019/0221020 A1    Jul. 18, 2019

Related U.S. Application Data

(63) Continuation of application No. PCT/CN2017/098624, filed on Aug. 23, 2017.

(30) Foreign Application Priority Data

Aug. 26, 2016 (CN) .......................... 2016 1 0730795

(51) Int. Cl.
*G06T 11/60* (2006.01)
*H04L 29/08* (2006.01)
(Continued)

(52) U.S. Cl.
CPC .......... *G06T 11/60* (2013.01); *G06F 3/04845* (2013.01); *G06T 3/4038* (2013.01);
(Continued)

(58) Field of Classification Search
CPC ... G06T 11/60; G06T 3/4038; G06F 3/04845; H04L 67/10
See application file for complete search history.

(56) References Cited

U.S. PATENT DOCUMENTS 7,828,661 B1 * 11/2010 Fish .................. A63F 13/87
463/42
2001/0049297 A1 * 12/2001 Hibscher .............. A63F 13/12
463/9
(Continued)

FOREIGN PATENT DOCUMENTS

CN    102930522 A  *  2/2013
CN    106355551 A     1/2017

OTHER PUBLICATIONS

International Search Report issued in corresponding International Application No. PCT/CN2017/098624 dated Sep. 28, 2017 (2 pages).

(Continued)

Primary Examiner — Sarah Lhymn
(74) Attorney, Agent, or Firm — Osha Bergman Watanabe & Burton LLP

(57) ABSTRACT

Embodiments of the present disclosure provides a method for image splicing. The method may include: receiving a cooperative image-splicing request sent by a source electronic device, in which the cooperative image-splicing request includes an identifier of a target image-splicing template and N cooperative-partner identifiers, and N is an integer greater than or equal to 1; sending the cooperative image-splicing request to N target electronic devices corresponding to the N cooperative-partner identifiers respectively; and acquiring a target spliced image according to image splicing operations of the source electronic device and the N target electronic devices.

8 Claims, 9 Drawing Sheets

(51) Int. Cl.
  *G06T 3/40* (2006.01)
  *G06F 3/0484* (2013.01)
  *H04L 29/06* (2006.01)
  *G06T 11/20* (2006.01)
(52) U.S. Cl.
  CPC .............. *H04L 67/10* (2013.01); *H04L 67/28* (2013.01); *H04L 67/42* (2013.01); *G06T 11/20* (2013.01); *G06T 2200/24* (2013.01)

(56) References Cited

U.S. PATENT DOCUMENTS

| | | | | |
|---|---|---|---|---|
| 2007/0186007 A1* | 8/2007 | Field | ....................... | G06Q 30/02 709/233 |
| 2010/0016083 A1* | 1/2010 | Bruce | ................ | G06Q 30/0269 463/42 |
| 2011/0086706 A1* | 4/2011 | Zalewski | ................ | A63F 13/61 463/36 |
| 2012/0010734 A1* | 1/2012 | Youm | ..................... | A63F 13/67 700/92 |
| 2012/0284642 A1* | 11/2012 | Sitrick | .................. | G06F 40/197 715/753 |
| 2013/0090171 A1* | 4/2013 | Holton | .................... | A63F 13/63 463/42 |
| 2013/0260888 A1* | 10/2013 | Thornton | ................. | A63F 13/80 463/42 |
| 2013/0344927 A1* | 12/2013 | Stegall | .................... | A63F 13/10 463/9 |
| 2014/0128135 A1* | 5/2014 | Balise, III | ............. | A63F 3/0423 463/9 |
| 2014/0128137 A1* | 5/2014 | Balise, III | ............... | A63F 13/80 463/10 |
| 2014/0378232 A1* | 12/2014 | Rama Rao | .............. | A63F 13/35 463/42 |
| 2015/0141150 A1* | 5/2015 | Zha | ......................... | A63F 13/70 463/42 |
| 2015/0328547 A1* | 11/2015 | Uriu | ........................ | A63F 13/48 463/42 |
| 2015/0352435 A1* | 12/2015 | Imai | ...................... | A63F 9/0612 463/9 |
| 2016/0203577 A1* | 7/2016 | Bell | ..................... | G07F 17/3223 715/753 |
| 2017/0282055 A1* | 10/2017 | McKevitt | ................ | A63F 13/25 |

OTHER PUBLICATIONS

Written Opinion issued in corresponding International Application No. PCT/CN2017/098624 dated Sep. 28, 2017 (4 pages).

* cited by examiner

METHOD FOR IMAGE SPLICING

CROSS-REFERENCE TO RELATED APPLICATION

This application is a continuation application of International Application No. PCT/CN2017/098624, filed on Aug. 23, 2017, which claims the priority of the Chinese patent application No. 201610730795.0 filed on Aug. 26, 2016 by BEIJING KINGSOFT INTERNET SECURITY SOFTWARE CO., LTD., entitled "Jigsaw Puzzle Processing Method, Device, Electronic Apparatus and Server".

TECHNICAL FIELD

The present disclosure relates to the field of communication technology, and in particular, to a method for image splicing.

BACKGROUND

With the development of technologies, smart terminals have increasingly rich functions, which not only may realize a daily communication, but also may meet requirements of work, entertainment and learning in people's daily life, such as taking photos, performing an image splicing or beautifying on photos and the like.

At present, in common operations of the image splicing, an image-splicing template is selected firstly, and then multiple photos are selected, thus generating a spliced image. After that, each image in each template may be rotated, zoomed, dragged, replaced, such that the images may be in various combinations and various spliced images may be acquired.

However, the above-mentioned method for image splicing has a monotonous form, with a poor interaction and a low convenience.

SUMMARY

The present disclosure aims at solving at least one of technical problems in the related art to some extent.

To this end, an embodiment of the present disclosure proposes a method of image splicing.

Another embodiment of the present disclosure proposes a method of image splicing.

Yet another embodiment of the present disclosure proposes a method of image splicing.

An embodiment of the present disclosure provides a method for image splicing. The method may include: receiving a cooperative image-splicing request sent by a source electronic device, in which the cooperative image-splicing request includes an identifier of a target image-splicing template and N cooperative-partner identifiers, and N is an integer greater than or equal to 1; sending the cooperative image-splicing request to N target electronic devices corresponding to the N cooperative-partner identifiers respectively; and acquiring a target spliced image according to image splicing operations of the source electronic device and the N target electronic devices.

Another embodiment of the present disclosure provides a method for image splicing. The method may include: generating a cooperative image-splicing request according to an identifier of a target image-splicing template selected by a first user and N cooperative-partner identifiers, in which N is an integer greater than or equal to 1; sending the cooperative image-splicing request to a server; receiving a response message sent by the server, in which the response message is configured to indicate that a target electronic device of N target electronic devices corresponding to the N cooperative-partner identifiers respectively agrees to participate in the image splicing; and acquiring a target spliced image according to image splicing operations of the server and the N target electronic devices.

Yet another embodiment of the present disclosure provides a method for image splicing. The method may include: receiving a cooperative image-splicing request forwarded by a server from a source electronic device, in which the cooperative image-splicing request includes an identifier of a target image-splicing template; acquiring the target image-splicing template corresponding to the identifier of the target image-splicing template; returning a response message to the server, in which the response message is configured to indicate that a target electronic device corresponding to a cooperative-partner identifier agrees to participate in the image splicing; and acquiring a target spliced image according to image splicing operations of the server and the source electronic device.

BRIEF DESCRIPTION OF THE DRAWINGS

The above and/or additional aspects and advantages of the present disclosure will become apparent and easily to be understood with reference to the accompanying drawings, in which.

DETAILED DESCRIPTION

Figure 1:
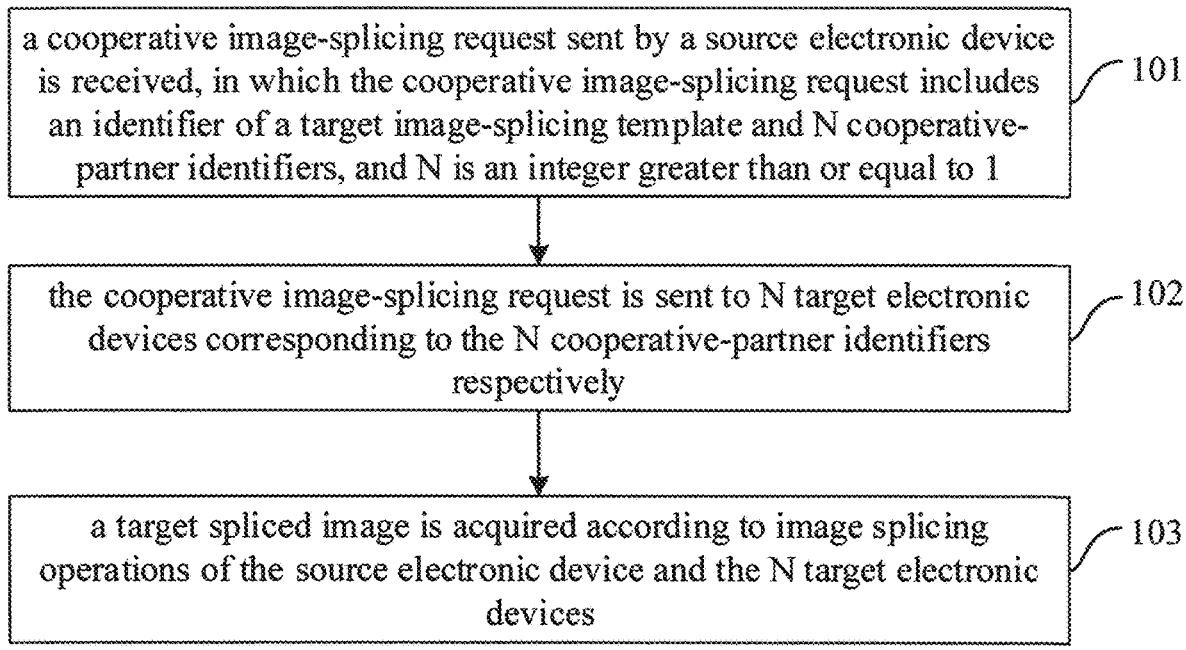
FIG. 1 is a flow chart of a method for image splicing according to an embodiment of the present disclosure.

Embodiments of the present disclosure are described in detail below, and the examples of the embodiments are illustrated in the drawings, in which the same or similar reference numerals are used to refer to the same or similar elements or elements having the same or similar functions. The embodiments described below with reference to the accompanying drawings are intended to be illustrative, and are not to be construed as limitations.

A method and an apparatus of image splicing, an electronic device and a server of embodiments of the present disclosure are described below with reference to the accompanying drawings.

FIG. 1 is a flow chart of a method for image splicing according to an embodiment of the present disclosure.

As illustrated in FIG. 1, the method for image splicing may include followings.

At block 101, a cooperative image-splicing request sent by a source electronic device, in which the cooperative image-splicing request includes an identifier of a target image-splicing template and N cooperative-partner identifiers, and N is an integer greater than or equal to 1.

The execution subject of the method for image splicing provided in the embodiment is an apparatus for image splicing provided in the present disclosure, and the apparatus may be configured to be implemented in a server.

Specifically, embodiments of the present disclosure are mainly for solving problems in the prior art. For example, an image is only spliced by one user, and the methods in the prior are monotonous and have poor interactivity. Therefore, a method for image splicing implemented by multiple people is proposed.

The source electronic device refers to an electronic device used by a user who initiates the cooperative image splicing, and the identifier of the source electronic device may refer to a product identifier corresponding to the source electronic device used by the user who initiates the cooperative image-splicing request, or may refers to an identifier of an account name of the user who initiates the cooperative image-splicing request, and the like. The image-splicing cooperative-partner identifier refers to a nickname, an account, a QR code and the like of the image-splicing cooperative-partner selected by the user who initiates the cooperative image splicing, which may uniquely distinguish the identifier of the image-splicing cooperative partner from other cooperative partners.

At block 102, the cooperative image-splicing request is sent to N target electronic devices corresponding to the N cooperative-partner identifiers respectively.

Specifically, after receiving the cooperative image-splicing request, the server may send the cooperative image-splicing request to respective target electronic devices used by the image-splicing cooperative partner, such that each image-splicing cooperative partner acquires a target image-splicing template according to the request.

It should be noted that, when the server sends the cooperative image-splicing request to the target electronic device, only the identifier of the target image-splicing template and the identifier of the source electronic device may be sent to the target electronic device, or, the identifier of the target image-splicing template and the identifier of the source electronic device and the identifiers of other target electronic devices may be sent to this electronic device, such that the electronic device receiving the cooperative image-splicing request may know which electronic devices are involved in the cooperative image splicing operation according to the cooperative image-splicing request.

At block 103, a target spliced image is acquired according to image splicing operations of the source electronic device and the N target electronic devices.

An image splicing operation refers to operations of selecting images, adding images and the like performed by the source electronic device or the target electronic device.

Specifically, after the server forwards the cooperative image-splicing request sent by the source electronic device to the respective target electronic devices, the user may select an image in the corresponding electronic device, and place the image in the image-splicing template, or, the user may send the selected image to the server, such that the server may place the image in the image-splicing template to acquire the final target spliced image. In other words, the above act in the block 103 may be implemented in the following two ways.

Example 1

A second image and second position information sent by a first electronic device are received.

The second image and the second position information are sent to a second electronic device, in which the second electronic device is different from the first electronic device.

The target spliced image sent by the second electronic device is acquired.

The first electronic device may be the source electronic device or the target electronic device, in other words, the target spliced image may be completed by the source electronic device or by the target electronic device, which is not limited in this embodiment.

In addition, the second image refers to an image selected by the first electronic device and used to completing the target spliced image, and the second image may be one image or a plurality of images, which is not limited in this embodiment. The second position information indicates a position determined by the first electronic device and used to place the second image in the target image-splicing template.

In a specific implementation, after receiving the second image and the determined second position information sent by the first electronic device, the server sends the second image and the determined second position information to the second electronic device, such that the target spliced image may be acquired after the second electronic device places the second image in the target image-splicing template according to the second position information, and the second electronic device may send the target spliced image to the server, such that the server may send the target spliced image to the first electronic device again, and the respective electronic devices may share the same target spliced image.

Example 2

M images sent by the source electronic device and the N target electronic devices are received, in which M is a positive integer greater than or equal to 2.

The M images is placed into the target image-splicing template according to a first preset rule to acquire the target spliced image.

The first preset rule refers to a rule used to specify a position of the image provided by each electronic device in the target image-splicing template, which may be determined by the server, or by the source electronic device or any target electronic device, which is not limited in this embodiment.

In this example, the cooperative image splicing is completed by the server. The server receives the M images sent by the respective electronic devices, and then allocates positions for the M images, or places the M images into the target image-splicing template according to positions used to place the M images and determined by any electronic device participating in the cooperative image splicing, such that the target spliced image may be acquired. After that, the server may send the target spliced image to the respective electronic devices, such that the electronic devices may share the same spliced image by cooperation.

It should be noted that, after the server sends the cooperative image-splicing request to the target electronic device, if the target electronic device stores an image-splicing template corresponding to the identifier of the target image-splicing template, the target electronic device may directly load the image-splicing template, so as to fill images in the image-splicing template with the source electronic device and the server.

In a possible implementation of this embodiment, if there is no image-splicing template corresponding to the identifier of the target image-splicing template stored in the target electronic device, the target electronic device may send a request for acquiring a target image-splicing template to the server. In other words, after the act in block 102, the method also includes: receiving an image-splicing template acquiring request sent by at least one target electronic device, in which the image-splicing template acquiring request carries the identifier of the target image-splicing template; and sending the target image-splicing template corresponding to the identifier of the target image-splicing template to a target electronic device sending the image-splicing template acquiring request.

For example, if a user P sends a cooperative image-splicing request to the server S via the electronic device A, in which the cooperative image-splicing request includes the cooperative-partner identifier which is identified as Q and the identifier of the target image-splicing template which is identified as X, the server may send the cooperative image-splicing request to the target electronic device B used by the user Q after receiving the corporative image-splicing request. As the electronic device B does not include the image-splicing template with the identifier identified as X, such that the electronic device B may send a request for acquiring the image-splicing template with the identifier identified as X to the server S. After that, the server S may send the image-splicing template W corresponding to the image splicing identifier identified as the X to the electronic B, such that A and B may corporate to perform the image splicing operation.

With the method for image splicing according to embodiments of the present disclosure, a cooperative image-splicing request sent by a source electronic device is received firstly, in which the cooperative image-splicing request includes an identifier of a target image-splicing template and N cooperative-partner identifiers, and N is an integer greater than or equal to 1. The cooperative image-splicing request is sent to N target electronic devices corresponding to the N cooperative-partner identifiers respectively. A target spliced image is acquired according to image splicing operations of the source electronic device and the N target electronic devices. Therefore, multiple people may corporate to perform the image splicing, thereby improving the flexibility and interactivity of the image splicing activity, and improving the user experience.

According to the above analysis, the target spliced image acquired by the server may be completed by the source electronic device or any target electronic device, or may be completed by the server. The above method is further described by taking an example in which the server completes the target image splicing with reference to FIG. 2.

Figure 2:
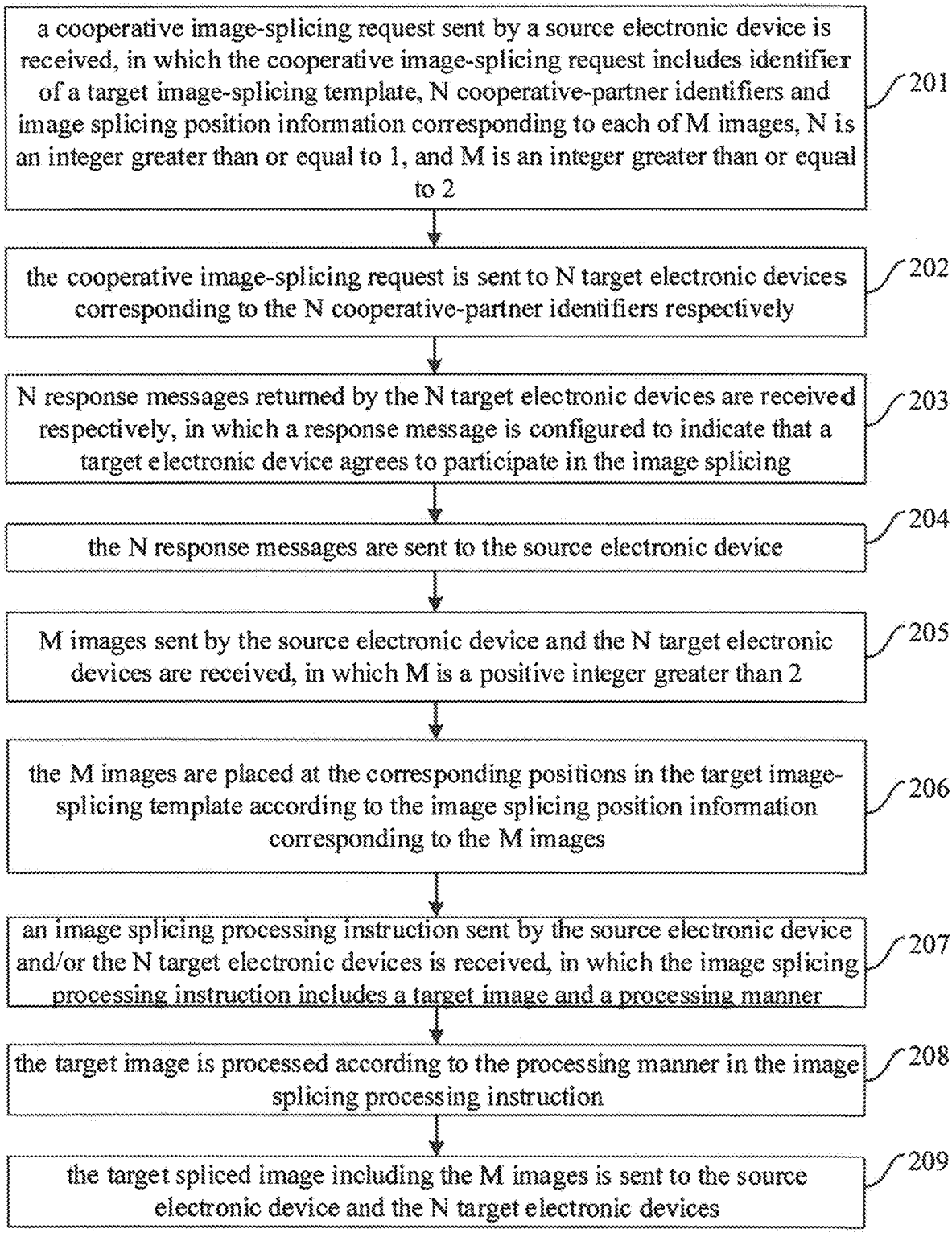
FIG. 2 is a flow chart of a method for image splicing according to another embodiment of the present disclosure.

FIG. 2 is a flow chart of a method for image splicing of another embodiment of the present disclosure.

As illustrated in FIG. 2, the method for image splicing may include followings.

At block 201, a cooperative image-splicing request sent by a source electronic device is received, in which the cooperative image-splicing request may include identifier of a target image-splicing template, N cooperative-partner identifiers and image splicing position information corresponding to each of M images, N is an integer greater than or equal to 1, and M is an integer greater than or equal to 2.

It can be understood that, M is the number of images which could be placed in the target image-splicing template corresponding to the identifier of the target image-splicing template. For example, if there are two positions for placing two images in the target image-splicing template, M is 2, and if there are five positions for placing five images in the target image-splicing template, M is 5.

At block 202, the cooperative image-splicing request is sent to N target electronic devices corresponding to the N cooperative-partner identifiers respectively.

At block 203, N response messages returned by the N target electronic devices are received respectively, in which a response message is configured to indicate that a target electronic device agrees to participate in the image splicing.

At block 204, the N response messages are sent to the source electronic device.

Specifically, since the target electronic device receives the cooperative image-splicing request, the target electronic device may not be able to participate in the cooperative image splicing operation due to other operations such as making a call, receiving an email and the like, such that the target electronic device may be set to return a response message to the server when determining that it may participate in the cooperative image splicing, and the server returns the response message to the source electronic device, such that the source electronic device may determine that the target electronic device agrees to participate in the cooperative image splicing.

At block 205, M images sent by the source electronic device and the N target electronic devices are received, in which M is a positive integer greater than 2.

It should be noted that the source electronic device and the target electronic device may simultaneously send an image to the server after the target electronic device agrees to participate in the cooperative image splicing. Alternatively, the image file may be sent to the server simultaneously during the interaction with the server.

For example, the source electronic device may send the first image and the first position information at the same time when sending the cooperative image-splicing request.

Specifically, the source electronic device may select the image to be placed in the target image-splicing template and specify a position of the image in the target image template at the same time when sending the cooperative image-splicing request to the server. It may be understood that the first image may be one image or multiple images, and the corresponding first position information may include only one piece of position information, and may also include multiple pieces of position information, which is not limited in this embodiment.

At block 206, the M images are placed at the corresponding positions in the target image-splicing template according to the image splicing position information corresponding to the M images.

It may be understood that, if the cooperative image-splicing request sent by the source electronic device does not include the image splicing position information respectively corresponding to the M images, the server may randomly allocate the position information for the M images, or the M images may be placed in the target image-splicing template in sequence in an receiving order of the M images according to a preset rule such as from the top to the bottom, from the left to the right and the like, or the image splicing position information corresponding to the M images respectively may be sent by any target electronic device to the server, which is not limited in this embodiment.

At block 207, an image splicing processing instruction sent by the source electronic device and/or the N target electronic devices is received, in which the image splicing processing instruction includes a target image and a processing manner.

At block 208, the target image is processed according to the processing manner in the image splicing processing instruction.

Specifically, the respective electronic devices may also add a text, a filter effect, or a sticker to the image after sending the image to the server. In other words, the above processing manner may be one or more of adding a text, a filter effect, or a sticker and the like. The target image refers to an image to be processed which is selected by the electronic device.

In the specific implementation, the server may perform a process such as adding a filter effect, sticking a sticker and the like on the target image after receiving the image splicing processing instruction sent by any electronic device.

It should be noted that the above processing manner may be using a specific image splicing processing tool, such as a sticker or a piece of text and the like. Alternatively, if the target image is processed in a usual manner, such as adding a sticker included in the server, the image splicing processing instruction may only include an identifier of the sticker, such that the server may acquire the corresponding sticker from a database according to the identifier of the sticker, and place it at the corresponding position.

At block 209, the target spliced image including the M images is sent to the source electronic device and the N target electronic devices.

After the server completes the target spliced image, the target spliced image may be sent to the source electronic device and the target electronic device, such that the source electronic device and the target electronic device may share the target spliced image.

Specifically, the user may select images to be loaded in the electronic device after opening the target image-splicing template in the electronic device, or capture the image to be loaded using the electronic device and place the selected or captured image in the target image-splicing template, such that the apparatus for image splicing may receive the image sent by the electronic device.

Figures 3A, 3B, 3C, 3D:
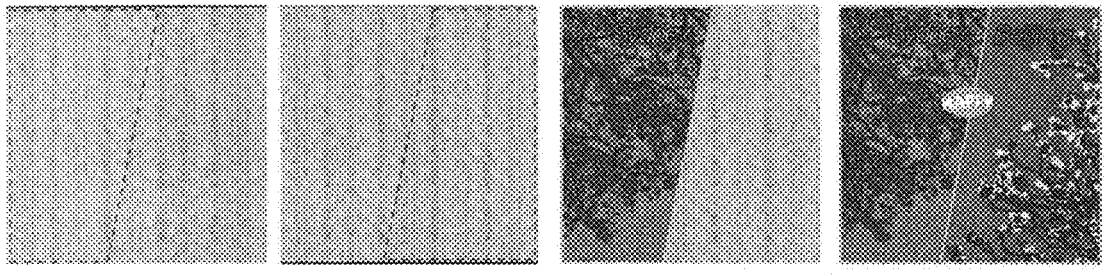
FIGS. 3a-3d are schematic diagrams of specific implementation scenarios of a method for image splicing according to embodiments of the present disclosure.

For example, FIGS. 3a-3d are schematic diagrams of specific implementation scenarios of a method for image splicing according to embodiments of the present disclosure. As shown in FIG. 3a and FIG. 3b, if there are two areas for placing images in the target image-splicing template selected by the user P when the user initiates the cooperative image-splicing request, and the user selects the area surrounded by dotted lines shown in FIG. 3a as the area to place the image, the area surrounded by dotted lines shown in FIG. 3b is assigned to a cooperative partner Q to place the image. After receiving the image sent by the user P, the apparatus for image splicing may place the image sent by the user P into the area surrounded by dotted lines shown in FIG. 3a, as illustrated in FIG. 3c. After receiving the image sent by Q, the apparatus for image splicing may place the image sent by Q into the area surround by the dotted line shown in FIG. 3b, as illustrated in FIG. 3d.

The apparatus for image splicing may acquire images sent by the respective electronic devices in multiple ways. For example, after selecting an image, the respective electronic devices submit or send the selected image to the apparatus for image splicing. Alternatively, after the respective users put the selected image into the corresponding area in their own electronic device, the apparatus for image splicing may receive the images and their corresponding position information synchronously, such that the spliced image of the target image-splicing template may be completed.

With the method for image splicing of the embodiment of the present disclosure, a cooperative image-splicing request sent by the source electronic device is received, in which the request includes an identifier of a target image-splicing template, N cooperative-partner identifiers, and the image splicing position information corresponding to the M images, in which N is an integer greater than or equal to 1. After that, the cooperative image-splicing request is sent to the N target electronic devices corresponding to the N cooperative-partner identifiers respectively, such that the N target electronic devices acquire the target image-splicing template according to the identifier of the target image-splicing template. After the M images sent by the source electronic device or the target electronic device are received, the M images may be placed into the target image-splicing template according to the corresponding image splicing position information of the M images, and the completed spliced image is sent to the source electronic device and the target electronic device, such that the user saves or shares the completed spliced image. Therefore, multiple people may corporate to perform the image splicing, thereby improving the flexibility and interactivity of the image splicing activity, satisfying multiple requirements of the user and improving the user experience.

The method for image splicing provided by the present disclosure will be further described with reference to FIG. 4 by taking an example of the source electronic device side.

Figure 4:
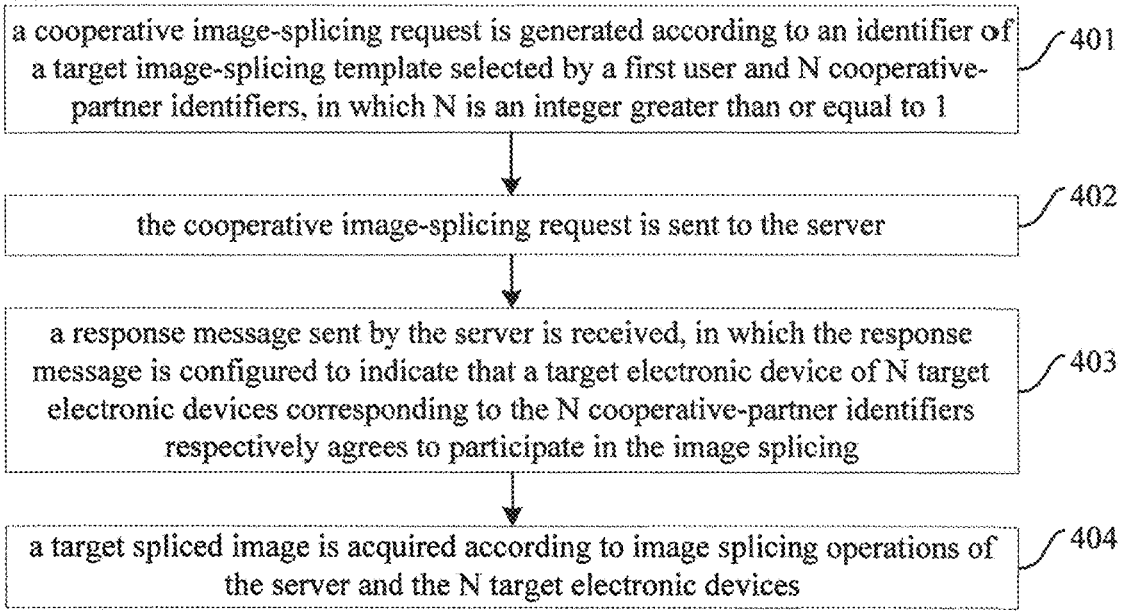
FIG. 4 is a schematic flow chart of a method for image splicing according to another embodiment of the present disclosure.

FIG. 4 is a schematic flow chart of a method for image splicing according to another embodiment of the present disclosure.

As shown in FIG. 4, the method for image splicing may include followings.

At block 401, a cooperative image-splicing request is generated according to an identifier of a target image-splicing template selected by a first user and N cooperative-partner identifiers, in which N is an integer greater than or equal to 1.

In actual use, the first user may select an image splicing mode such as single-person image splicing, two-person image splicing, three-person image splicing and the like after opening the image splicing application in the source electronic device. If the first user selects a single-person image splicing mode, the image splicing application may provide the user with image splicing services based on existing image splicing manner. If the first user selects a multi-person image splicing mode, the image splicing application may provide different image-splicing templates to the first user for selecting, and then determine the identifier of the target image-splicing template and the identifier of the corresponding cooperative partner according to the touch operation of the first user in the source electronic device.

Further, the server may provide different image-splicing templates to the first user according to the number of cooperative partners selected by the first user, or provide different image-splicing templates to the first user according to the image splicing scene selected by the first user, such as entertainment, hilarity, blessing and the like, which is not limited in this embodiment.

At block 402, the cooperative image-splicing request is sent to the server.

At block 403, a response message sent by the server is received, in which the response message is configured to indicate that a target electronic device of N target electronic devices corresponding to the N cooperative-partner identifiers respectively agrees to participate in the image splicing.

At block 404, a target spliced image is acquired according to image splicing operations of the server and the N target electronic devices.

Specifically, the target spliced image may be acquired by the source electronic device in various manners. For example, a target spliced image may be completed according to the image provided by the target electronic device, or may be acquired from the server side and completed by the server or the target electronic device, which is not limited in this embodiment.

Example 1

If the target spliced image is completed by the server or the target electronic device, the source electronic device specifies placement positions for the respective images in the target image-splicing template, that is, in a possible implementation form of the embodiment, the first user may also indicate positions for placing the images from himself/ herself and the respective cooperative partners. In other words, the method may also include followings.

A position assignment instruction inputted by the first user is received, in which the position assignment instruction is configured to indicate image splicing position information corresponding to each of M images, and M is a positive integer greater than or equal to 2.

The position assignment instruction is sent to the server.

Correspondingly, the above act in block 404 may specifically include followings.

The target spliced image returned from the server is received.

Specifically, after the source electronic device specifies the position information of the M images, the server or the target electronic device may place the M images in the target image-splicing template according to the position information of the M images, such that the target spliced image is acquired. The process of the server completing the target spliced image may refer to the detailed description of the embodiment of the server side, which is not described in detail herein.

It should be noted that, if the target spliced image is completed by the server or the target electronic device, the source electronic device may need to provide at least one image. Correspondingly, the method may also include the followings.

A first image acquired.

First position information of the first image in the target image-splicing template is determined according to a second preset rule.

Correspondingly, the above act in block 402 may include followings.

The cooperative image-splicing request including the identifier of the target image-splicing template, the N cooperative-partner identifiers, the first image and the first position information is sent to the server.

The source electronic device may directly select the first image from images stored in local, and may also trigger to turn on a camera in the source electronic device to capture the first image, which is not limited in this embodiment.

Further, the second preset rule may be determined according to the position assignment instruction from the first user, or may be determined according to a position instruction sent by the server. In other words, the above step of determining the first position information of the first image in the target image-splicing template according to a second preset rule may include followings.

The first position information of the first image in the target image-splicing template is determined according to the position assignment instruction.

Alternatively, the first position information of the first image in the target image-splicing template is determined according to the position instruction sent by the server.

It should be noted that the position instruction sent by the server may be generated by the server according to a certain rule, or may be generated by the target electronic device and sent to the server, which is not limited in this embodiment.

It may be understood that, the source electronic device may send the position assignment instruction to the server together with the cooperative image-splicing request, or may send the position assignment instruction to the server after receiving the response message returned by the target electronic device, which is not limited in this embodiment.

Example 2

If the target spliced image is completed by the target electronic device, the method may also include the followings.

A third image sent by the server is received.

Third position information of the third image in the target image-splicing template is determined according to a second preset rule.

The third image is placed into the target image-splicing template according to the third position information, to acquire the target spliced image.

The third image refers to an image sent by the respective target electronic devices to the server. After receiving the third image, the source electronic device may determine the third position corresponding to the third image according to the position assignment instruction specified by the user or the position instruction sent by the server, so as to place the third image in the target image-splicing template to acquire the target spliced image.

In a possible implementation of the embodiment, the first user may also process the image in the target image-splicing template. Correspondingly, the method may also include followings.

An image splicing processing instruction inputted by the first user is received, in which the image splicing processing instruction includes a target image and a processing manner.

The step of acquiring the target spliced image may include followings.

the target spliced image is acquired after processing the target image according to the processing manner in the image splicing processing instruction.

Alternatively, the image splicing processing instruction is sent to the server, and the target spliced image sent by the server is received, in which the target image in the target spliced image is an image processed in the processing manner.

Specifically, the first user may perform a processing such as adding a filter effect, sticking a sticker and the like on any image in the target spliced image. The first user may select the target image in multiple manners. For example, the first user may specify a position for the target image to be processed in the target image-splicing template, thereby selecting the target image. Alternatively, the first user may specify a cooperative-partner to select the target image, that is, the first user may specify which cooperative-partner to send the image to be processed, which is not limited in this embodiment.

In a specific implementation, if the target spliced image is completed by the source electronic device, the source electronic device may directly process the target image according to the image splicing processing instruction, thereby acquiring the final target spliced image. After that, the target spliced image is sent to the respective target electronic devices via the server. If the target spliced image is completed by the server or the target electronic device, the source electronic device may send the image splicing processing instruction to the server or to the other target electronic devices via the server, and then the server or the target electronic device may return the final target spliced image to the source electronic device after performing a processing on the target image.

With the method for image splicing provided by embodiments of the present disclosure, a cooperative image-splicing request is firstly generated according to an operation of the first user, and then the cooperative image-splicing request is sent to the server, and after a response message returned by the server is received, a target spliced image is acquired according to image splicing operations of the server and the N target electronic devices. Therefore, multiple people may corporate to perform the image splicing, thereby improving the flexibility and interactivity of the image splicing activity, and improving the user experience.

The method for image splicing provided by the present disclosure will be further described with reference to FIG. 5 by taking an example of the target electronic device side.

Figure 5:
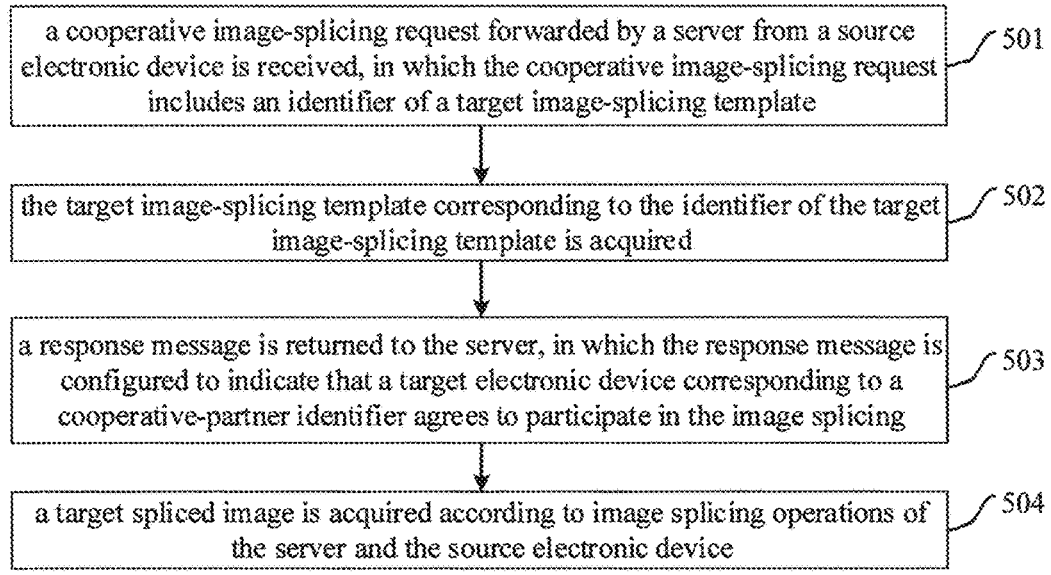
FIG. 5 is a schematic flow chart of a method for image splicing according to yet another embodiment of the present disclosure.

FIG. 5 is a schematic flow chart of a method for image splicing according to yet another embodiment of the present disclosure.

As illustrated in FIG. 5, the method for image splicing may include followings.

At block 501, a cooperative image-splicing request forwarded by a server from a source electronic device is received, in which the cooperative image-splicing request may include an identifier of a target image-splicing template.

It should be noted that the cooperative image-splicing request may also include the identifier of the source electronic device and the identifiers of other target electronic devices, such that the target electronic device knows who sends the cooperative image-splicing request and which users participate in the image splicing.

At block 502, the target image-splicing template corresponding to the identifier of the target image-splicing template is acquired.

Specifically, the respective image-splicing templates may be stored in the target electronic device, and after receiving the cooperative image-splicing request, the corresponding image-splicing template may be acquired according to the target image-splicing template identifier in the request. In a possible implementation, the target image-splicing template corresponding to the target image-splicing template identifier may not be stored in the target electronic device. In this case, the target electronic device may request the template from the server. In other words, the method may also include followings.

It is determined whether there is the target image-splicing template corresponding to the identifier of the target image-splicing template in local.

If there is no target image-splicing template corresponding to the identifier of the target image-splicing template in local, an image-splicing template acquiring request is sent to the server, in which the image-splicing template acquiring request carries the identifier of the target image-splicing template.

The target image-splicing template returned by the server is received.

At block 503, a response message is returned to the server, in which the response message is configured to indicate that a target electronic device corresponding to a cooperative-partner identifier agrees to participate in the image splicing.

Specifically, after receiving the cooperative image-splicing request message, the target electronic device may send a reminder message to the second user via a pop-up window and the like, such that the second user determines whether to participate in the image splicing, and a response message is returned to the server when the user agrees.

It should be noted that, if the user does not agree to the participate in the image splicing, a rejection message may also be returned to the server, thereby finishing the cooperative image-splicing request.

At block 504, a target spliced image is acquired according to image splicing operations of the server and the source electronic device.

Specifically, in the same manner as the source electronic device side acquiring the target spliced image, the target electronic device may complete the target spliced image according to the image provided by the source electronic device, or the target spliced image may be sent by the server to the target electronic device after the target spliced image is completed by the server or other electronic devices. In other words, in a possible implementation, the method may also include followings.

A fourth image sent by the server is received, in which the fourth image is an image selected by another user participating in the image splicing.

Fourth position information of the fourth image in the target image-splicing template is determined according to a third preset rule.

The fourth image is placed into the target image-splicing template according to the fourth position information, to acquire the target spliced image.

Alternatively, the method may also include followings.

A fifth image is acquired.

The fifth image is placed into the target image-splicing template according to a third preset rule.

The target electronic device may directly select the fifth image from images stored in local, or may trigger to turn on a camera to acquire the fifth image, which is not limited in this embodiment.

The third preset rule includes: a position instruction sent by the server; or a position assignment instruction inputted by a second user.

Further, the target electronic device may also perform a process such as adding a filter effect, sticking a sticker and the like on the respective images. Correspondingly, the method may also include: receiving an image splicing processing instruction inputted by a second user, in which the image splicing processing instruction includes a target image and a processing manner; in which acquiring the target spliced image includes: processing the target image according to the processing manner in the image splicing processing instruction; or sending the image splicing processing instruction to the server, and receiving the target spliced image sent by the server, in which the target image in the target spliced image is an image processed in the processing manner.

It should be noted that the method for image splicing provided in this embodiment is a method for interacting with the server side and the source electronic device side. The specific implementation process and principle may refer to the detailed description of the foregoing embodiments, and details are not described herein again.

The method for image splicing provided by the present disclosure will be further described with reference to the interaction signaling diagram illustrated in FIG. 6 by taking an example of a scene in which the target electronic device side completes the image splicing.

Figure 6:
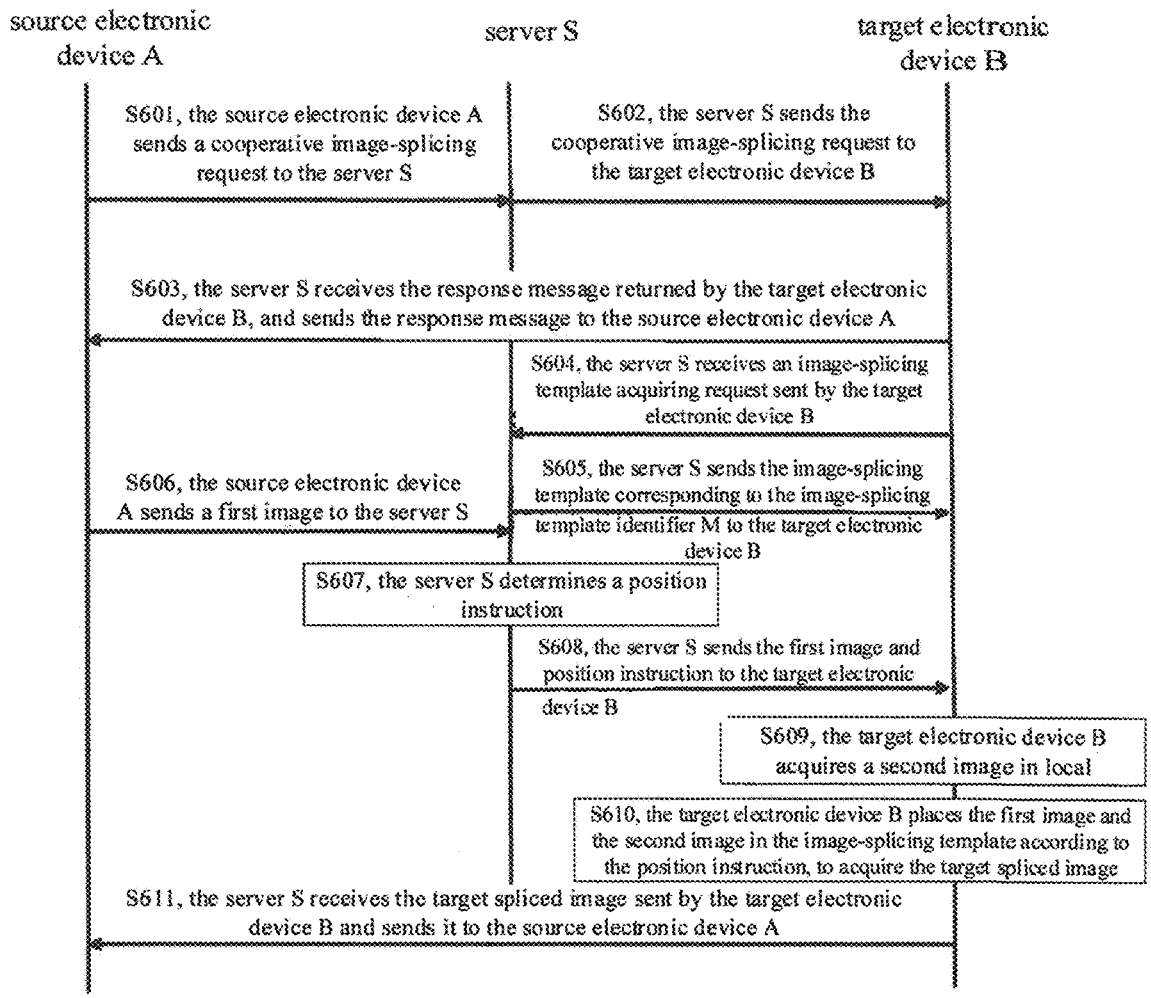
FIG. 6 is an interaction signaling diagram of a method for image splicing according to an embodiment of the present disclosure.

FIG. 6 is an interaction signaling diagram of a method for image splicing according to an embodiment of the present disclosure.

As shown in FIG. 6, the method for image splicing is executed by a source electronic device A, a server S, and a target electronic device B. The specific interaction process is described as follows.

At block S601, the source electronic device A sends a cooperative image-splicing request to server S.

The cooperative image-splicing request includes a target electronic device identifier B and a target image-splicing template identifier M.

At block S602, the server S sends the cooperative image-splicing request to the target electronic device B.

At block S603, the server S receives the response message returned by the target electronic device B, and sends the response message to the source electronic device A.

At block S604, the server S receives an image-splicing template acquiring request sent by the target electronic device B.

At block S605, the server S sends the image-splicing template corresponding to the image-splicing template identifier M to the target electronic device B.

At block S606, the source electronic device A sends a first image to the server S.

At block S607, the server S determines a position instruction.

At block S608, the server S sends the first image and position instruction to the target electronic device B.

At block S609, the target electronic device B acquires a second image in local.

At block S610, the target electronic device B places the first image and the second image in the image-splicing template according to the position instruction, to acquire the target spliced image.

At block S611, the server S receives the target spliced image sent by the target electronic device B and sends it to the source electronic device A.

Through the above interaction among the source electronic device A, the target electronic device B and the server S, a two-person image splicing may be achieved, thereby improving the flexibility and interaction of the image splicing activity, and improving the user experience.

The method for image splicing provided by the present disclosure will be further described with reference to the interaction signaling diagram illustrated in FIG. 7 by taking an example of a scene in which the server side completes the image splicing.

Figure 7:
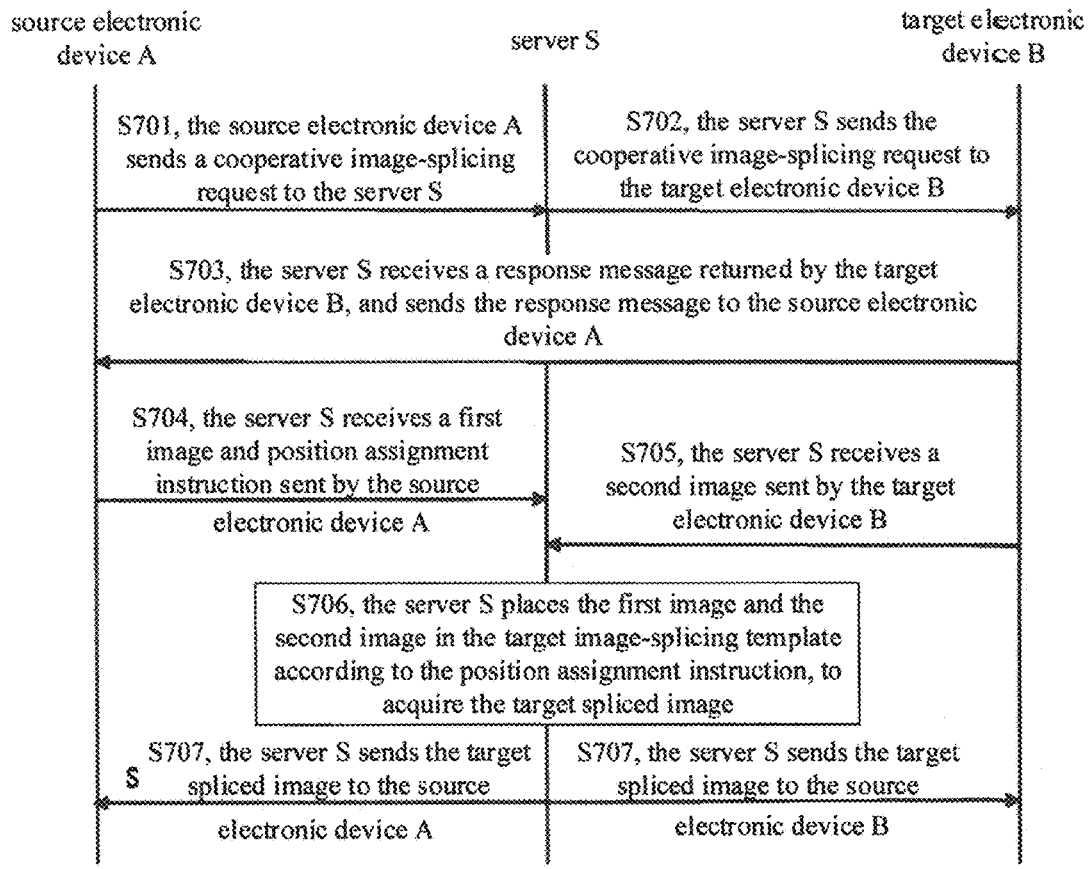
FIG. 7 is an interaction signaling diagram of a method for image splicing according to another embodiment of the present disclosure.

FIG. 7 is an interaction signaling diagram of a method for image splicing according to another embodiment of the present disclosure.

As shown in FIG. 7, the method for image splicing is executed by a source electronic device A, a server S, and a target electronic device B. The specific interaction process is described as follows.

At block S701, the source electronic device A sends a cooperative image-splicing request to the server S.

The cooperative image-splicing request includes a target electronic device identifier B and a target image-splicing template identifier M.

At block S702, the server S sends a cooperative image-splicing request to the target electronic device B.

Specifically, since the server completes the cooperative image splicing, there is no target image-splicing template in the target electronic device B, such that the target image-splicing template corresponding to the target image-splicing template identifier may not need to be acquired.

At block S703, the server S receives a response message returned by the target electronic device B, and sends the response message to the source electronic device A.

At block S704, the server S receives a first image and position assignment instruction sent by the source electronic device A.

At block S705, the server S receives a second image sent by the target electronic device B.

At block S706, the server S places the first image and the second image in the target image-splicing template according to the position assignment instruction, to acquire the target spliced image.

At block S707, the server S sends the target spliced image to the source electronic device A and the target electronic device B respectively.

Through the above interaction among the source electronic device A, the target electronic device B and the server S, a two-person image splicing may be achieved, thereby improving the flexibility and interaction of the image splicing activity, and improving the user experience.

In order to implement the above embodiment, the present disclosure also proposes an apparatus for image splicing.

Figure 8:
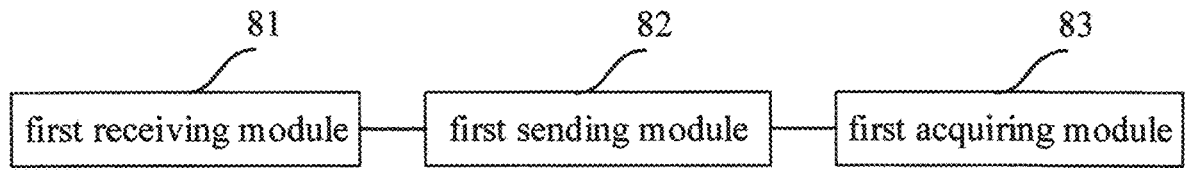
FIG. 8 is a schematic structural diagram of an apparatus for image splicing according to an embodiment of the present disclosure.

FIG. 8 is a schematic structural diagram of an apparatus for image splicing according to an embodiment of the present disclosure.

As shown in FIG. 8, the apparatus for image splicing may include a first receiving module 81, a first sending module 82 and a first acquiring module 83.

The first receiving module 81 is configured to receive a cooperative image-splicing request sent by a source electronic device, in which the cooperative image-splicing request includes an identifier of a target image-splicing template and N cooperative-partner identifiers, and N is an integer greater than or equal to 1.

The first sending module 82 is configured to send the cooperative image-splicing request to N target electronic devices corresponding to the N cooperative-partner identifiers respectively.

The first acquiring module 83 is configured to acquire a target spliced image according to image splicing operations of the source electronic device and the N target electronic devices.

Specifically, the apparatus for image splicing provided in this embodiment may be configured in an image splicing application server to execute the method for image splicing provided in FIG. 1 to FIG. 3 of the above embodiments.

It should be noted that the foregoing explanation of embodiments of the method for image splicing illustrated in FIG. 1 is also applicable to the apparatus for image splicing in this embodiment, which will not be described in detail herein.

With the method for image splicing according to embodiments of the present disclosure, a cooperative image-splicing request sent by a source electronic device is received firstly, in which the cooperative image-splicing request includes an identifier of a target image-splicing template and N cooperative-partner identifiers, and N is an integer greater than or equal to 1. The cooperative image-splicing request is sent to N target electronic devices corresponding to the N cooperative-partner identifiers respectively. A target spliced image is acquired according to image splicing operations of the source electronic device and the N target electronic devices. Therefore, multiple people may corporate to perform the image splicing, thereby improving the flexibility and interactivity of the image splicing activity, and improving the user experience.

Figure 9:
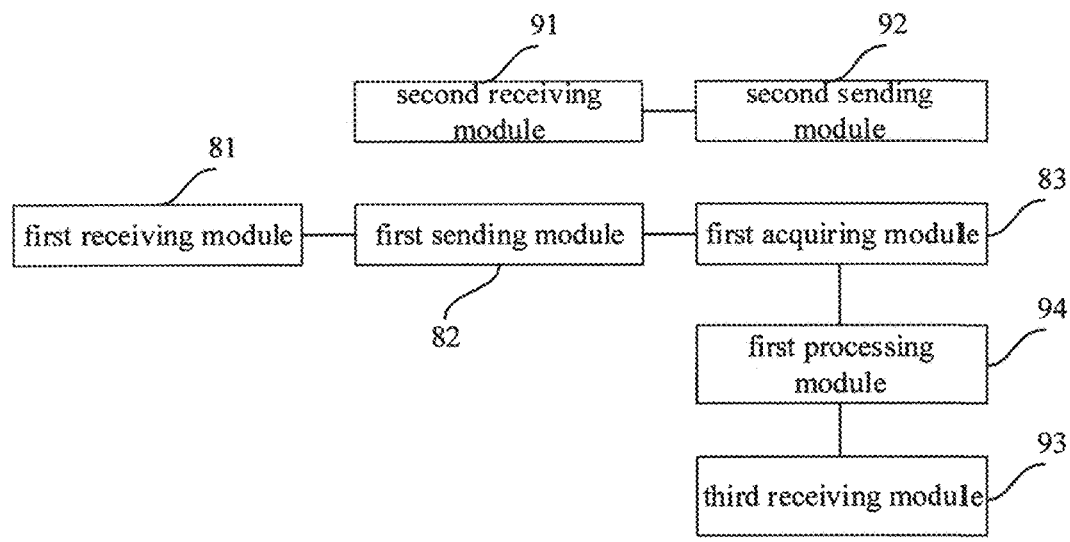
FIG. 9 is a schematic structural diagram of an apparatus for image splicing according to another embodiment of the present disclosure.

FIG. 9 is a schematic structural diagram of an apparatus for image splicing according to another embodiment of the present disclosure. As shown in FIG. 9, based on the embodiment shown in FIG. 8, the apparatus for image splicing may also include a second receiving module 91 and a second sending module 92.

The second receiving module is configured to receive N response messages returned by the N target electronic devices respectively, in which a response message is configured to indicate that a target electronic device agrees to participate in the image splicing.

The second sending module 92 is configured to send the N response messages to the source electronic device.

In a possible implementation of this embodiment, the cooperative image-splicing request may also include a first image and first position information.

In a possible implementation of this embodiment, the first acquiring module 83 is specifically configured to: receive a second image and second position information sent by a first electronic device; send the second image and the second position information to a second electronic device, in which the second electronic device is different from the first electronic device; and receive the target spliced image sent by the second electronic device.

In another possible implementation of the embodiment, the first acquiring module 83 is specifically configured to: receive M images sent by the source electronic device and the N target electronic devices, in which M is a positive integer greater than or equal to 2; and place the M images into the target image-splicing template according to a first preset rule to acquire the target spliced image.

In another possible implementation of this embodiment, the cooperative image-splicing request may also include image splicing position information corresponding to each of the M images, and the first acquiring module 83 is specifically configured to: place the M images at corresponding positions in the target image-splicing template according to the image splicing position information corresponding to each of the M images.

In another possible implementation of this embodiment, the apparatus may also include a third receiving module 93 and a first processing module 94.

The third receiving module 93 is configured to receive an image splicing processing instruction sent by the source electronic device and/or the N target electronic devices, in which the image splicing processing instruction includes a target image and a processing manner.

The processing module 94 is configured to process the target image according to the processing manner in the image splicing processing instruction.

In another possible implementation of this embodiment, the apparatus may also include: a third sending module, configured to send the target spliced image including the M images to the source electronic device and the N target electronic devices.

In another possible implementation of this embodiment, the apparatus may also include: a fourth receiving module and a fourth sending module.

The fourth receiving module is configured to receive an image-splicing template acquiring request sent by at least one of the N target electronic devices, in which the image-splicing template acquiring request carries the identifier of the target image-splicing template.

The fourth sending module is configured to send the target image-splicing template corresponding to the identifier of the target image-splicing template to a target electronic device which sends the image-splicing template acquiring request.

It should be noted that the foregoing explanation of the embodiment of the method for image splicing illustrated in FIG. 2 is also applicable to embodiments of the apparatus for image splicing, which will not be described in detail herein.

With the apparatus for image splicing according to embodiments of the present disclosure, a cooperative image-splicing request sent by a source electronic device is received firstly, in which the cooperative image-splicing request includes an identifier of a target image-splicing template and N cooperative-partner identifiers, and N is an integer greater than or equal to 1. The cooperative image-splicing request is sent to N target electronic devices corresponding to the N cooperative-partner identifiers respectively, such that the N target electronic devices may acquire the target image-splicing template according to the target image-splicing template identifier. After the image sent by the source electronic device or the target electronic device, the image may be placed in the target image-splicing template according to a preset rule, such that the user may save or share the completed spliced image. Therefore, multiple people may corporate to perform the image splicing, thereby improving the flexibility and interactivity of the image splicing activity, satisfying multiple requirements of the user and improving the user experience.

Figure 10:
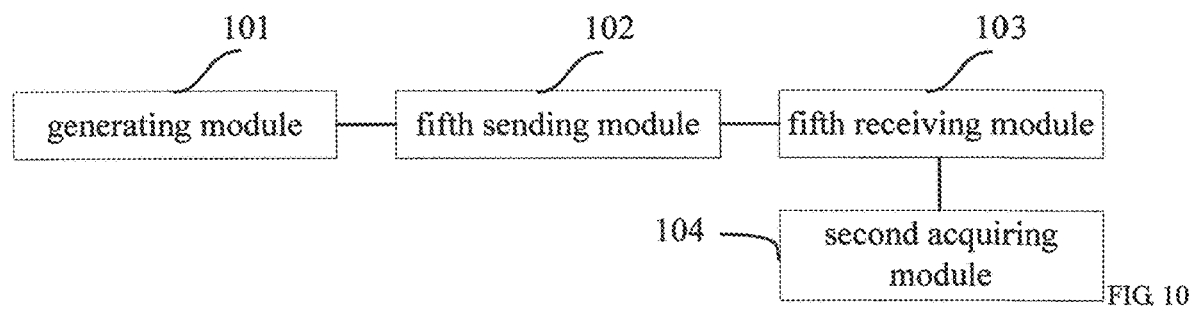
FIG. 10 is a schematic structural diagram of an apparatus for image splicing according to another embodiment of the present disclosure.

FIG. 10 is a schematic structural diagram of an apparatus for image splicing according to another embodiment of the present disclosure. The apparatus for image splicing illustrated in FIG. 10 may be implemented on the source electronic device side.

As shown in FIG. 10, the apparatus for image splicing may include a generating module 101, a fifth sending module 102, a fifth receiving module 103 and a second acquiring module 104.

The generating module is configured to generate a cooperative image-splicing request according to an identifier of a target image-splicing template selected by a first user and N cooperative-partner identifiers, in which N is an integer greater than or equal to 1.

The fifth sending module 102 is configured to send the cooperative image-splicing request to a server.

The fifth receiving module 103 is configured to receive a response message sent by the server, in which the response message is configured to indicate that a target electronic device of N target electronic devices corresponding to the N cooperative-partner identifiers respectively agrees to participate in the image splicing.

The second acquiring module is configured to acquire a target spliced image according to image splicing operations of the server and the N target electronic devices.

In a possible implementation of this embodiment, the apparatus may also include: a sixth receiving module and a sixth sending module.

The sixth receiving module is configured to receive a position assignment instruction inputted by the first user, in which the position assignment instruction is configured to indicate image splicing position information corresponding to each of M images, and M is a positive integer greater than or equal to 2.

The sixth sending module is configured to send the position assignment instruction to the server.

The second acquiring module is specifically configured to receive the target spliced image returned from the server.

In a possible implementation of this embodiment, the apparatus may also include: a third acquiring module and a first determining module.

The third acquiring module is configured to acquire a first image.

The first determining module is configured to determine first position information of the first image in the target image-splicing template according to a second preset rule.

The fifth sending module is specifically configured to: send the cooperative image-splicing request including the identifier of the target image-splicing template, the N cooperative-partner identifiers, the first image and the first position information to the server.

In a possible implementation of the embodiment, the second acquiring module is specifically configured to: receive a third image sent by the server; determine, according to a second preset rule, third position information of the third image in the target image-splicing template; and place the third image into the target image-splicing template according to the third position information, to acquire the target spliced image.

The second preset rule includes: the position assignment instruction; or a position instruction sent by the server.

In another possible implementation of this embodiment, the apparatus may also include a seventh receiving module, configured to receive an image splicing processing instruction inputted by the first user, in which the image splicing processing instruction includes a target image and a processing manner.

The second acquiring module is specifically configured to: acquire the target spliced image after processing the target image according to the processing manner in the image splicing processing instruction; or send the image splicing processing instruction to the server, and receive the target spliced image sent by the server, in which the target image in the target spliced image is an image processed in the processing manner.

It should be noted that the foregoing explanation of the embodiment of the method for image splicing illustrated in FIG. 4 is also applicable to embodiments of the apparatus for image splicing, which will not be described in detail herein.

Figure 11:
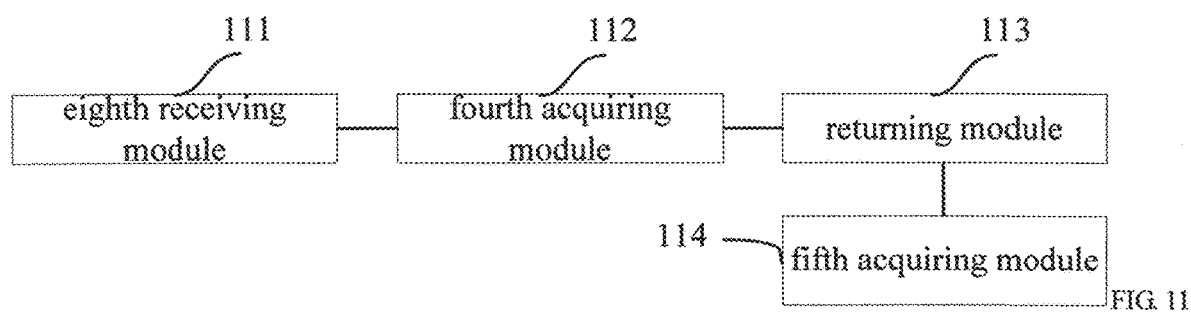
FIG. 11 is a schematic structural diagram of an apparatus for image splicing according to another embodiment of the present disclosure.

FIG. 11 is a schematic structural diagram of an apparatus for image splicing according to another embodiment of the present disclosure. The apparatus for image splicing in this embodiment may be configured to be implemented on the target electronic device side.

As shown in FIG. 11, the apparatus for image splicing may include: an eighth receiving module 111, a fourth acquiring module 112, a returning module 113 and a fifth acquiring module 114.

The eighth receiving module 111 is configured to receive a cooperative image-splicing request from a source electronic device forwarded by a server, in which the cooperative image-splicing request includes an identifier of a target image-splicing template.

The fourth acquiring module 112 is configured to acquire the target image-splicing template corresponding to the identifier of the target image-splicing template.

The returning module 113 is configured to return a response message to the server, in which the response message is configured to indicate that a target electronic device corresponding to a cooperative-partner identifier agrees to participate in the image splicing.

The fifth acquiring module 114 is configured to acquire a target spliced image according to image splicing operations of the server and the source electronic device.

In a possible implementation of this embodiment, the fourth acquiring module 112 is specifically configured to: determine whether there is the target image-splicing template corresponding to the identifier of the target image-splicing template in local; send an image-splicing template acquiring request to the server if there is no target image-splicing template corresponding to the identifier of the target image-splicing template in local, in which the image-splicing template acquiring request carries the identifier of the target image-splicing template; and receive the target image-splicing template returned by the server.

In a possible implementation of this embodiment, the fifth acquiring module 114 is specifically configured to: receive a fourth image sent by the server, in which the fourth image is an image selected by another user participating in the image splicing; determine, according to a third preset rule, fourth position information of the fourth image in the target image-splicing template; and place the fourth image into the target image-splicing template according to the fourth position information, to acquire the target spliced image.

In another possible implementation of this embodiment, the fifth acquiring module 114 is specifically configured to: acquire a fifth image; and place the fifth image into the target image-splicing template according to a third preset rule.

The third preset rule includes: a position instruction sent by the server; or a position assignment instruction inputted by a second user.

In a further possible implementation of this embodiment, the apparatus may also include: a ninth receiving module, configured to receive an image splicing processing instruction inputted by a second user, in which the image splicing processing instruction includes a target image and a processing manner.

The fifth acquiring module 114 is specifically configured to: process the target image according to the processing manner in the image splicing processing instruction; or send the image splicing processing instruction to the server, and receive the target spliced image sent by the server, in which the target image in the target spliced image is an image processed in the processing manner.

It should be noted that the foregoing explanation of the embodiment of the method for image splicing shown in FIG. 5 is also applicable to the embodiment of the apparatus for image splicing, which will not be described in detail herein.

Figure 12:
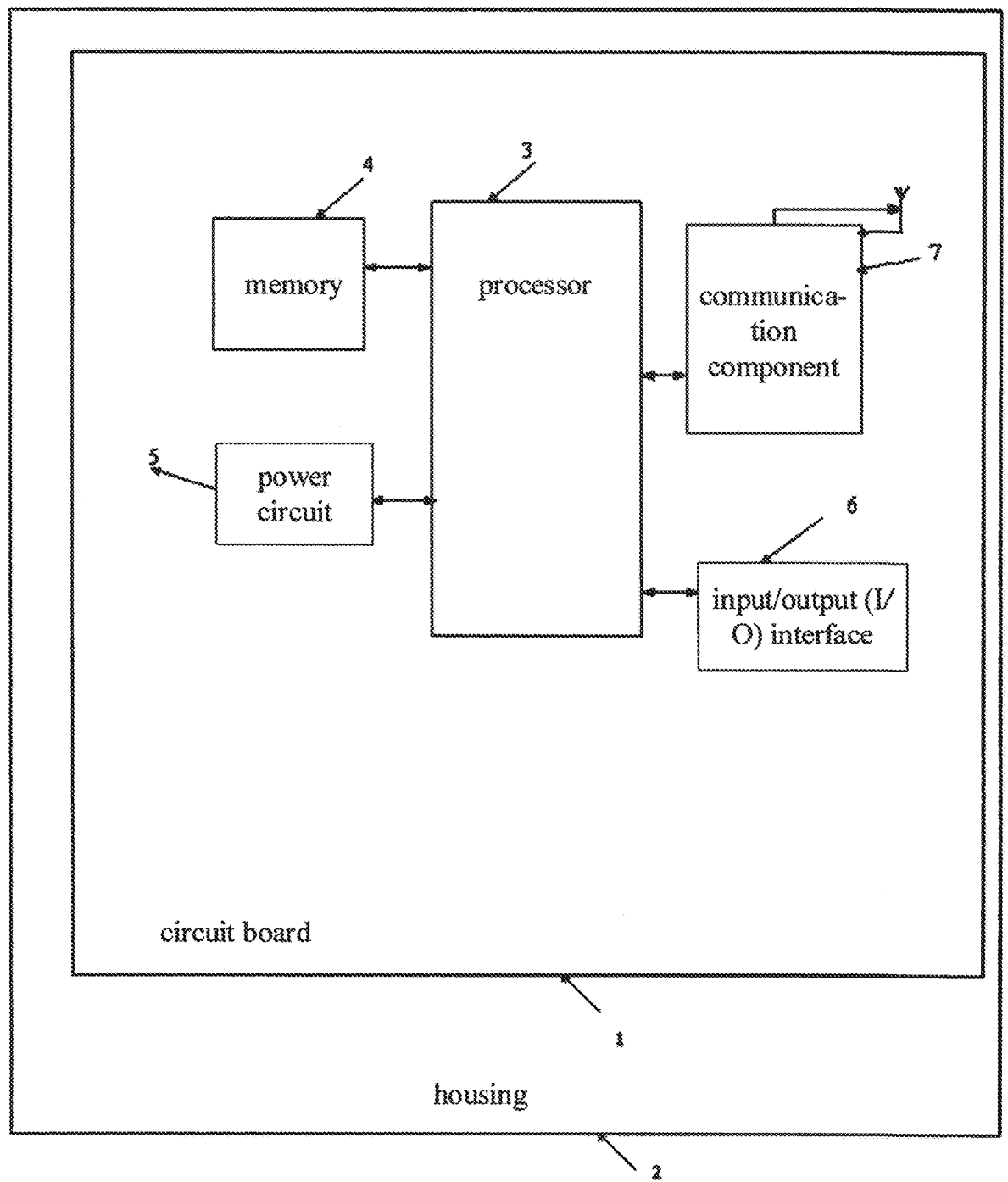
FIG. 12 is a schematic structural diagram of a server according to an embodiment of the present disclosure.

FIG. 12 is a schematic structural diagram of a server according to an embodiment of the present disclosure.

As shown in FIG. 12, the server includes: one or more of a circuit board 1, a housing 2, a processor 3, a memory 4, a power circuit 5, an input/output (I/O) interface 6, and a communication component 7. The circuit board 1 is disposed inside a space enclosed by the housing 2, the processor 3 and the memory 4 are disposed on the circuit board 1; the power circuit 5 is configured to supply power to each circuit or component of the server; the memory 4 is configured to store executable program codes; the processor 3 runs a program corresponding to the executable program codes by reading the executable program codes stored in the memory 4 so as to perform: receiving a cooperative image-splicing request sent by a source electronic device, in which the cooperative image-splicing request includes an identifier of a target image-splicing template and N cooperative-partner identifiers, and N is an integer greater than or equal to 1; sending the cooperative image-splicing request to N target electronic devices corresponding to the N cooperative-partner identifiers respectively; and acquiring a target spliced image according to image splicing operations of the source electronic device and the N target electronic devices.

It should be noted that the foregoing explanation of the embodiment of the method for image splicing shown in FIG. 1 or 2 is also applicable to embodiments of the server, which will not be described in detail herein.

Based on the method for image splicing provided in the foregoing embodiment, the embodiment of the present disclosure may also provide a storage medium, such as a read only memory, a magnetic disk or an optical disk.

The storage medium is configured to store an application for executing the method for image splicing illustrated in FIG. 1 or FIG. 2 of the present disclosure at runtime.

Further, the embodiment of the present disclosure may also provide an application, in which the application is configured to execute the method for image splicing illustrated in FIG. 1 or FIG. 2 of the present disclosure at runtime.

Figure 13:
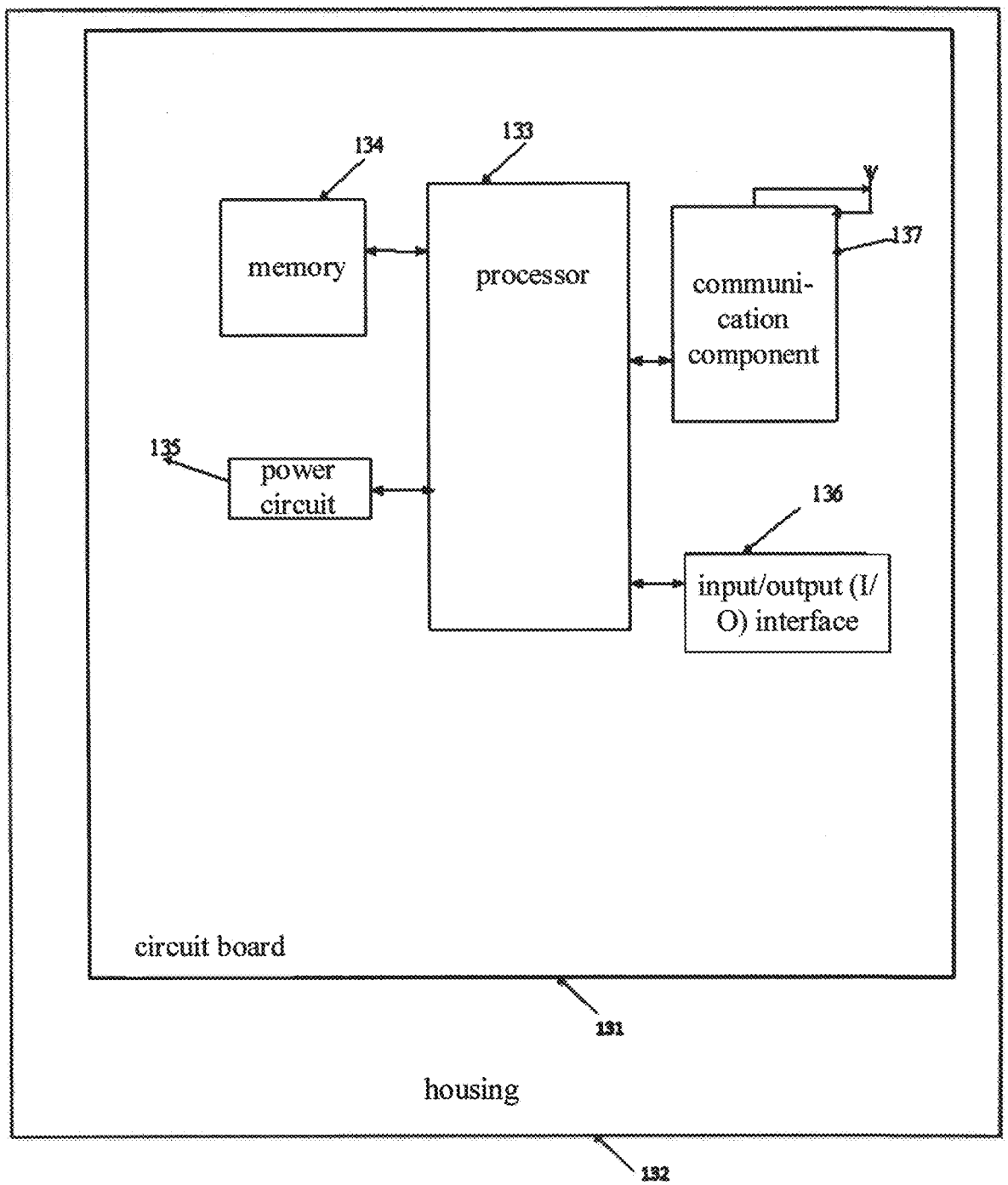
FIG. 13 is a schematic structural diagram of an electronic device according to an embodiment of the present disclosure.

FIG. 13 is a schematic structural diagram of an electronic device according to an embodiment of the present disclosure.

As shown in FIG. 13, the electronic device includes: one or more of the following components: a circuit board 131, a housing 132, a processor 133, a memory 134, a power circuit 135, an input/output (I/O) interface 136, and a communication component 137; in which the circuit board 131 is disposed inside a space surrounded by the housing 132, the processor 133 and the memory 134 are disposed on the circuit board 131; the power circuit 135 is configured to supply power to each circuit or component of the electronic device; the memory 134 is configured to store executable program codes; the processor 133 runs a program corresponding to the executable program codes by reading the executable program codes stored in the memory so as to perform: generating a cooperative image-splicing request according to an identifier of a target image-splicing template selected by a first user and N cooperative-partner identifiers, in which N is an integer greater than or equal to 1; sending the cooperative image-splicing request to a server; receiving a response message sent by the server, in which the response message is configured to indicate that a target electronic device of N target electronic devices corresponding to the N cooperative-partner identifiers respectively agrees to participate in the image splicing; and acquiring a target spliced image according to image splicing operations of the server and the N target electronic devices.

It should be noted that the foregoing explanation of the embodiment of the method image splicing illustrated in FIG. 4 is also applicable to the embodiment of the electronic device, which will not be described in detail herein.

Based on the method for image splicing provided by the above embodiments, the embodiment of the present disclosure may also provide a storage medium, such as a read only memory, a magnetic disk or an optical disk.

The storage medium is configured to store an application for executing the method for image splicing illustrated in FIG. 4 of the present disclosure at runtime.

Further, the embodiment of the present disclosure may also provide an application, in which the application is configured to execute the method for image splicing illustrated in FIG. 4 of the present disclosure at runtime.

Figure 14:
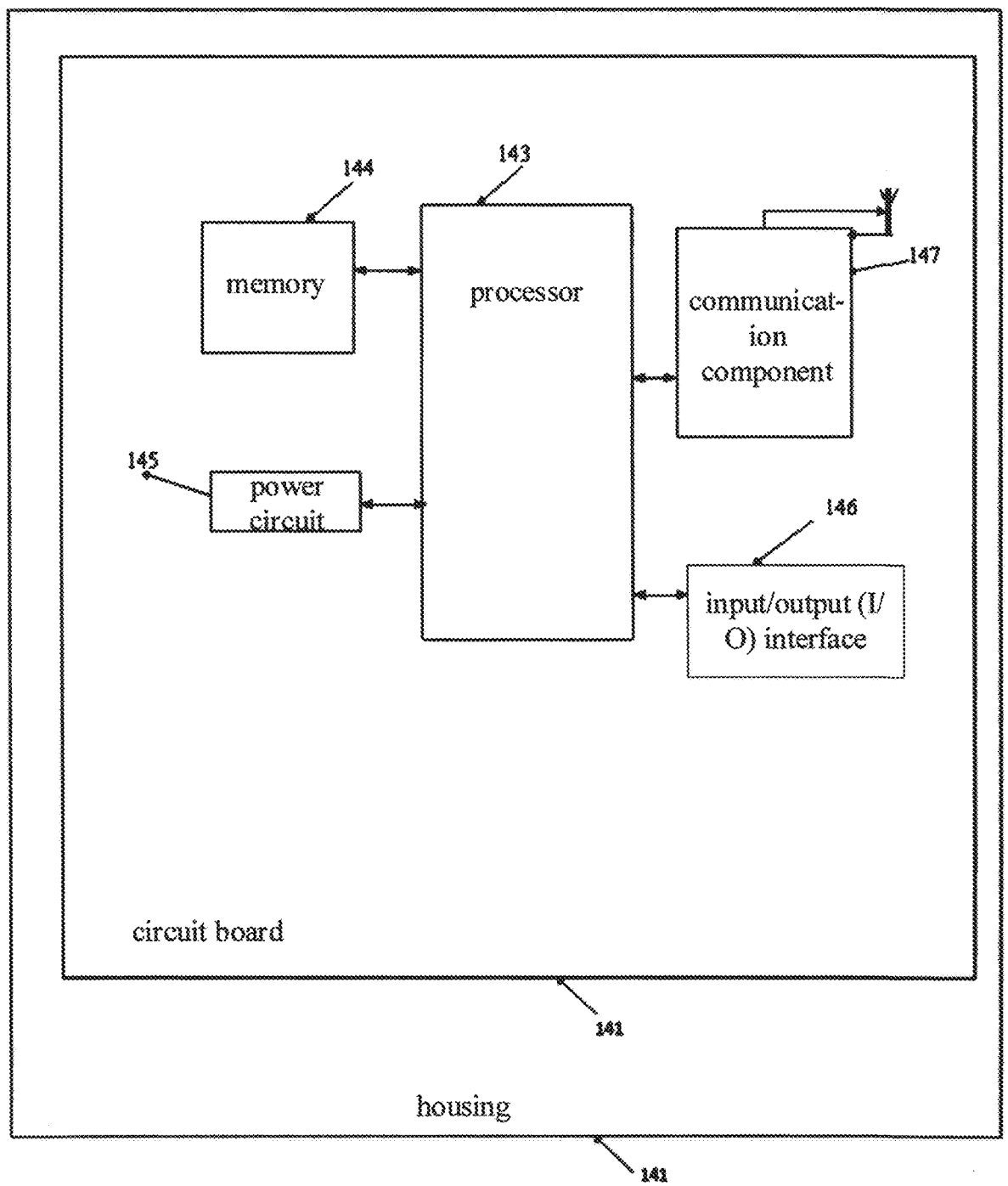
FIG. 14 is a schematic structural diagram of an electronic device according to another embodiment of the present disclosure.

FIG. 14 is a schematic structural diagram of an electronic device according to another embodiment of the present disclosure.

As shown in FIG. 14, the electronic device includes: one or more of the following components: a circuit board 141, a housing 142, a processor 143, a memory 144, a power circuit 145, an input/output (I/O) interface 146, and a communication component 147. The circuit board 141 is disposed inside a space surrounded by the housing 142, the processor 143 and the memory 144 are disposed on the circuit board 141; and the power circuit 145 is configured to supply power to each circuit or component of the electronic device; the memory 144 is configured to store executable program codes; the processor 143 runs a program corresponding to the executable program codes by reading the executable program codes stored in the memory 144 so as to perform: receiving a cooperative image-splicing request from a source electronic device forwarded by a server, in which the cooperative image-splicing request includes an identifier of a target image-splicing template; acquiring the target image-splicing template corresponding to the identifier of the target image-splicing template; returning a response message to the server, in which the response message is configured to indicate that a target electronic device corresponding to a cooperative-partner identifier agrees to participate in the image splicing; and acquiring a target spliced image according to image splicing operations of the server and the source electronic device.

It should be noted that the foregoing explanation of the embodiment of the method for image splicing illustrated in FIG. 5 is also applicable to the embodiment of the electronic device, which will not be described in detail herein.

Based on the method for image splicing provided by the above embodiments, the embodiment of the present disclosure may also provide a storage medium, such as a read only memory, a magnetic disk or an optical disk.

The storage medium is configured to store an application for executing the method for image splicing illustrated in FIG. 5 of the present disclosure at runtime.

Further, the embodiment of the present disclosure may also provide an application, in which the application is configured to execute the method for image splicing illustrated in FIG. 5 of the present disclosure at runtime.

Specifically, the application in the embodiment of the present disclosure may be implemented in any language, as long as the method for image splicing provided in embodiments of the present disclosure can be implemented.

In the description of the specification, the description with reference to the terms "one embodiment", "some embodiments", "example", "specific example", or "some examples" and the like means that a specific feature, structure, material or feature described in connection with the embodiment or example is included in at least one embodiment or example of the application. In the specification, the schematic representation of the above terms is not necessarily directed to the same embodiment or example. Furthermore, the described specific features, structures, materials, or characteristics may be combined in a suitable manner in any one or more embodiments or examples. In addition, various embodiments or examples described in the specification and features of various embodiments or examples may be combined and combined without departing from the scope of the present disclosure.

Any process or method description in the flow charts or otherwise described herein may be understood to represent a module, segment or portion of code that includes one or more executable instructions for implementing the steps of a particular logical function or process, and the scope of the preferred embodiments of the present disclosure includes additional implementations, in which the functions may be performed in a substantially simultaneous manner or in an inverse order depending on the functions involved, in addition to the order shown or discussed, which will be understood by those skilled in the art to which the embodiments of the present disclosure pertain.

It should be understood that portions of the application may be implemented in hardware, software, firmware, or a combination thereof. In the above-described implementations, multiple steps or methods may be implemented in software or firmware stored in a memory and executed by a suitable instruction execution system. For example, if implemented in hardware, as in another embodiment, it can be implemented by any one or combination of the following prior art: a discrete logic circuit having a logic gate for implementing logic functions on data signals, a specific integrated circuit having a suitable combinational logic gates, a programmable gate array (PGA), a field programmable gate array (FPGA) and the like.

The skilled in the art may understand that all or a part of the steps carried by the method of implementing the above embodiments may be completed by a relative hardware instructed by a program, and the program may be stored in a computer readable storage medium, and when the program is executed, one or a combination of the steps of the method embodiments is implemented.

The above mentioned storage medium may be a read only memory, a magnetic disk or an optical disk or the like. Although the embodiments of the present disclosure have been illustrated and described above, it may be understood that the above-described embodiments are illustrative and are not to be construed as a limitation of the scope of the present disclosure. The skilled in the art may have a change, modification, substitution and variation of the above embodiments within the scope of the present disclosure.

What is claimed is:

1. A method for image splicing, comprising:
   receiving a cooperative image-splicing request sent by a source electronic device, the cooperative image-splicing request comprising an identifier of a target image-splicing template and N cooperative-partner identifiers, and N being an integer greater than or equal to 1;
   sending the cooperative image-splicing request to N target electronic devices corresponding to the N cooperative-partner identifiers respectively; and
   acquiring a target spliced image according to image splicing operations of the source electronic device and the N target electronic devices, wherein acquiring the target spliced image according to the image splicing operations of the source electronic device and the N target electronic devices comprises:
   receiving M images sent by the source electronic device and the N target electronic devices, M being a positive integer greater than or equal to 2; and
   placing the M images into the target image-splicing template according to a first preset rule to acquire the target spliced image.

2. The method according to claim 1, wherein before acquiring the target spliced image according to the image splicing operations of the source electronic device and the N target electronic devices, the method further comprises:
   receiving N response messages returned by the N target electronic devices respectively, a response message being configured to indicate that a target electronic device agrees to participate in the image splicing; and
   sending the N response messages to the source electronic device.

3. The method according to claim 1, wherein the cooperative image-splicing request further comprises a first image and first position information.

4. The method according to claim 1, wherein acquiring the target spliced image according to the image splicing operations of the source electronic device and the N target electronic devices comprises:
   receiving a second image and second position information sent by a first electronic device;
   sending the second image and the second position information to a second electronic device, the second electronic device being different from the first electronic device; and
   receiving the target spliced image sent by the second electronic device.

5. The method according to claim 1, wherein the cooperative image-splicing request further comprises image splicing position information corresponding to each of the M images; and
   placing the M images into the target image-splicing template according to the first preset rule comprises:
   placing the M images at corresponding positions in the target image-splicing template according to the image splicing position information corresponding to each of the M images.

6. The method according to claim 1, further comprising:
   receiving an image splicing processing instruction sent by at least one of the source electronic device and the N target electronic devices, the image splicing processing instruction comprising a target image and a processing manner; and
   processing the target image according to the processing manner in the image splicing processing instruction.

7. The method according to claim 1, wherein after placing the M images into the target image-splicing template, the method further comprises:
   sending the target spliced image comprising the M images to the source electronic device and the N target electronic devices.

8. The method according to claim 1, wherein after sending the cooperative image-splicing request to the N target electronic devices corresponding to the N cooperative-partner identifiers respectively, the method further comprises:
   receiving an image-splicing template acquiring request sent by at least one of the N target electronic devices, the image-splicing template acquiring request carrying the identifier of the target image-splicing template; and
   sending the target image-splicing template corresponding to the identifier of the target image-splicing template to a target electronic device which sends the image-splicing template acquiring request.

\* \* \* \* \*